United States Patent Office 2,958,579
Patented Nov. 1, 1960

2,958,579

PROCESS FOR MANUFACTURE OF MOLECULAR SIEVE ADSORBENTS

John E. McCormick, Cincinnati, Ohio, and Emery H. Westerland, Kenmore, N.Y., assignors to Union Carbide Corporation, a corporation of New York No Drawing. Filed June 20, 1955, Ser. No. 516,778

7 Claims. (Cl. 23—113)

This invention relates to the manufacture of molecular sieve adsorbents which are crystalline synthetic zeolites. More particularly the invention relates to an improved process for synthesizing such materials, which process is suitable for their large-scale production.

Comparatively recent studies of adsorption processes have indicated a utility for molecular sieves of the zeolite family. These materials, which may be described generically as metal aluminum silicates, exhibit preferences for certain types of molecules that render them particularly suitable for many separation and adsorption procedures. In addition to a number of naturally occurring materials, which may also be synthesized, a number of synthetic zeolites not found in nature have been demonstrated to possess the desired characteristics. Conventionally the zeolites in question are prepared by mixing aqueous solutions of oxides of the desired ions in the proper proportions to form a gel at room temperatures. After agitation to insure homogeneity the gel is heated in a closed vessel to a temperature of about 100° C. The heating is continued until the crystal structure is developed. The actual heating time may vary from as little as 6 hours to 100 hours. Following the heating period the water of hydration is driven from the crystallized material to prepare the crystals for use as adsorbents.

While the process described above is satisfactory in some respects for the production of zeolitic molecular sieves, certain difficulties present themselves when an attempt is made to produce large quantities of the sieves. A prime difficulty is attributable to the slow and uneven heating of the gel which is due to the insulating properties of the gel itself. The slow and uneven heating gives rise to a number of problems, chief of which appears to be the formation of non-crystalline materials or more than one zeolitic molecular sieve.

It is a principal object of the present invention to provide a process for the production of molecular sieves of the zeolite family in a relatively pure form. It is a further object of the invention to provide a process for the production of uncontaminated molecular sieves of the zeolite family in relatively large quantities.

The objects of the invention are accomplished by preparing suitable aqueous solutions of components of the molecular sieve to be produced, heating these solutions to temperatures suitable for the crystallization of the molecular sieve, and rapidly mixing the solutions. The mixed solutions are then deposited in a heated crystallization tank where crystallization may proceed without further agitation.

The metal aluminum silicates which are synthesized according to the process of the present invention have a composition which may be represented as follows:

$$\frac{M_2}{n}O : Al_2O_3 : XSiO_2 : YH_2O$$

In the formula, "M" represents a cation, "n" represents the valence of the cation, "X" the mols of $SiO_2$ and "Y" the mols of $H_2O$. The cation may be any one or more of a number of metal ions as well as the other common cations such as ammonia and hydrogen. The cations most often found in these silicates are sodium, calcium and potassium. One cation may be exchanged for another using conventional ion-exchange techniques. The proportions of the elements in these silicates and their arrangement with respect to each other may differ somewhat giving the molecular sieves distinctive properties. The differences in molecular arrangement make possible the identification of the molecular sieves by means of X-ray diffraction patterns. The molecular sieves synthesized in the examples of the invention described below will be identified by formula and X-ray diffraction data.

The temperature to which the solutions should be heated is preferably in the range of from 80° to 100° C. The time during which the reactants are subjected to violent agitation at these temperatures should be as short as possible since prolonged mixing at high temperatures has been found to be a prime cause of contamination of the molecular sieve product.

Because of the ease with which the necessary materials can be dissolved in water the preparation of the sodium form of the synthetic molecular sieves has been found to be more convenient than the preparation of other forms. The sodium ion, which takes the place of "M" in the general formula given above, may be replaced by other ions by ion-exchange procedures if this becomes desirable.

To produce the sodium form of the molecular sieve, aqueous solutions of the reactants are prepared and mixed as described below. The solutions contain silicate, aluminate and sodium ions. Not all of these ions need be present in any one of the solutions. In the aggregate the solutions contain the prescribed materials in the proportion necessary to make the desired zeolite. Silica gel, silicic acid, or sodium silicate are convenient sources of the silica present in the solutions. Alumina may be obtained from activated alumina, gamma alumina, alumina trihydrate, or sodium aluminate, for example. Sodium hydroxide is a preferred source of the sodium ion.

As a specific example of the practice of the invention, the manufacture of sodium zeolite X will be described. Sodium zeolite X is described in detail in copending application, Serial No. 400,389, filed December 24, 1953 now U.S. Patent 2,882,244, issued April 14, 1959. The composition for zeolite X may be represented as $$0.9 \pm 0.2 \frac{M_2}{n}O : Al_2O_3 : 2.5 \pm 0.5 SiO_2 : O \text{ to } 8H_2O$$

A typical composition for the sodium form of zeolite X may be represented as $$0.9 Na_2O : Al_2O_3 : 2.5 SiO_2 : 6.1 H_2O$$

The major X-ray diffraction lines for a sample of crystalline zeolite X, including the sodium form thereof, are given in Table I:

TABLE I d Value of reflection in Å.

14.42±0.2
8.82±0.1
4.41±0.05
3.80±0.05
3.33±0.05
2.88±0.05
2.79±0.05
2.66±0.05

In obtaining the X-ray diffraction powder patterns, standard techniques were employed. The radiation was the Kα doublet of copper, and a Geiger counter spectrometer with a strip chart pen recorder was used. The peak heights, I, and the positions as a function of 2θ, where θ is the Bragg angle, were read from the spectrometer chart. From these, d(obs), the interplanar spacing in Å., corresponding to the recorded lines was calculated. The X-ray patterns indicate a cubic unit cell of dimensions between 24.5 Å. and 25.5 Å.

In a tank containing 37 gallons of water, about 28 pounds of sodium hydroxide (76% by weight $Na_2O$) were dissolved at room temperature. About 45 pounds of sodium aluminate (37.2% $Na_2O$ and 45.2% $Al_2O_3$) were then dissolved in the solution while the whole was agitated. In a separate tank an aqueous solution of sodium silicate was prepared by mixing about 31 gallons of water with about 108 pounds of sodium silicate solution (12.8% $Na_2O$ and 33.4% $SiO_2$). The solutions from the two tanks were then passed through separate heat exchangers at a rate of about 40 gallons per hour. The solutions were then introduced into the suction side of a centrifugal pump where reactants were thoroughly mixed and discharged into a crystallization tank. A gel formed immediately in the tank. The contents of the tank were maintained at 100° C. for about 11 hours, following which the crystallized product was filtered and washed. The crystals thus obtained may then be activated, as by heating to remove adsorbed water, and used in adsorption processes. A quantity of crystalline zeolite X weighing approximately 70 pounds was prepared by this procedure.

Quantities of sodium zeolite X (2 pounds and 250 pound) were also prepared using the procedures described above. In all cases the product was not appreciably contaminated with other crystals or compounds.

The crystalline form of the zeolitic molecular sieve prepared according to the teachings of this invention depends to a considerable degree upon proportions of the reactants present in the solutions to be mixed. In general, relatively pure sodium zeolite X will be obtained when the composition of the reacting mixtures, expressed in terms of oxide-mol ratios, falls within the following limits:

$SiO_2/Al_2O_3$ ---------------------------------- 2.5–5
$Na_2O/SiO_2$ ----------------------------------- 1.2–1.5
$H_2O/Na_2O$ ----------------------------------- 35–60

Other zeolites may be prepared according to the process of the invention by using appropriate reactants and proportions of reactants.

Another synthetic zeolite, designated sodium zeolite A, and described with particularity in copending application, Serial No. 400,388, filed December 24, 1953, now U.S. Patent No. 2,882,243, issued April 14, 1959, is obtained when the composition of the reacting mixtures, expressed in terms of oxide-mol ratios, falls within either of the following ranges:

|  | Range 1 | Range 2 |
|---|---|---|
| $SiO_2/Al_2O_3$ | 0.5–1.3 | 1.3–2.5 |
| $Na_2O/SiO_2$ | 1.0–3.0 | 0.8–3.0 |
| $H_2O/Na_2O$ | 33–200 | 33–200 |

Zeolite A has a composition which may be represented as

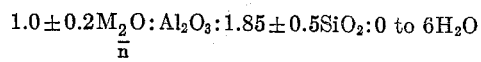

In this formula "M" represents a cation and "n" its valence. A typical composition for the sodium form of zeolite A may be represented as

The major lines of the X-ray diffraction pattern of zeolite A are shown in Table II. These lines were obtained using the same techniques employed with respect to the data shown in Table I.

TABLE II

*d Value of reflection in Å.*

12.2 ±0.2
8.6 ±0.2
7.05±0.15
4.07±0.08
3.68±0.07
3.38±0.06
3.26±0.05
2.96±0.05
2.73±0.05
2.60±0.05

In another example of the procedure of the invention, about 268 pounds of crystalline zeolite A were prepared. One solution consisted of 34 pounds of sodium hydroxide (76% by weight of $Na_2O$) in 67 gallons of water and 234 pounds of sodium aluminate (32.2% $Na_2O$ and 43.7% $Al_2O_3$). The other solution contained 420 pounds of sodium silicate (7% $Na_2O$ and 25% $SiO_2$) in 41.4 gallons of water. A flow rate of 120 gallons per hour for each solution was established and the solutions circulated through heat exchangers until their temperatures approximated 80° C. to 100° C. Following mixing, as in the previous example, the materials were held in a crystallization tank at a temperature of 100° C. for about 5 hours. The filtered product was found to be essentially pure zeolite A.

The holding time for the solutions does not appear to be critical provided only that crystallization is completed. In a number of tests zeolite X free of other crystalline materials was obtained by holding the reactants at a temperature of 100° C. for periods of time of 5, 6, 7, 8, 11, 20, 24, and 32 hours respectively.

What is claimed is:
1. A method for synthesizing a crystalline zeolitic molecular sieve which comprises preparing at least two separate aqueous solutions of reactants which in the aggregate contain water, silicate ions, aluminate ions, and metal ions selected from the group consisting of alkali metal ions and alkaline earth metal ions in the proportions required to form crystals of said molecular sieve; preheating said separate solutions to between about 80° C. to 100° C.; rapidly and intimately mixing said separate preheated solutions to form an aggregate solution; and holding said aggregate solution at between about 80° C. to 100° C. until crystals of said molecular sieve form.

2. A method for synthesizing a crystalline zeolitic molecular sieve which comprises preparing at least two separate aqueous solutions of reactants which in the aggregate when mixed contain water, silicate ions, aluminate ions and alkali metal ions in the proportions required to form crystals of said molecular sieve; preheating said separate solutions to between about 80° C. to 100° C.; rapidly and intimately mixing said separate preheated solutions to form an aggregate solution; and holding said aggregate solution without agitation at between about 80° C. to 100° C. until crystals of said molecular sieve form; separating said crystals from the mother liquor and then heating said crystals to remove adsorbed water therefrom.

3. A method for synthesizing sodium zeolite X which comprises preparing at least two separate aqueous solutions containing in the aggregate water, silicate ions, aluminate ions and sodium ions in such proportions that the oxide mole ratios of the reactants in the aggregate solution when mixed fall within the ranges $SiO_2/Al_2O_3$ ---------------------------- 2.5 to 5
$Na_2O/SiO_2$ ----------------------------- 1.2 to 1.5
$H_2O/Na_2O$ ----------------------------- 35 to 60 preheating said separate solutions to between about 80° C. and 100° C.; rapidly and intimately mixing said separate preheated solutions to form an aggregate solution; and holding said aggregate solution at a temperature between about 80° C. and 100° C. until crystals of sodium zeolite X form.

4. A method for synthesizing sodium zeolite A which comprises preparing at least two separate aqueous solutions containing in the aggregate water, silicate ions, aluminate ions and sodium ions in such proportions that the oxide mole ratios of the reactants in the aggregate solution when mixed fall within the ranges

|  | Range 1 | Range 2 |
|---|---|---|
| $SiO_2/Al_2O_3$ | 0.5 to 1.3 | 1.3 to 2.5. |
| $Na_2O/SiO_2$ | 1.0 to 3.0 | 0.8 to 3.0. |
| $H_2O/Na_2O$ | 33 to 200 | 33 to 200. | preheating said separate solutions to between about 80° C. and 100° C.; rapidly and intimately mixing said separate preheated solutions to form an aggregate solution; and holding said aggregate solution at a temperature between about 80° C. and 100° C. until crystals of sodium zeolite A form.

5. A method for synthesizing a crystalline zeolitic molecular sieve which comprises preparing a first aqueous solution containing silicate ions and alkali metal ions and a second aqueous solution containing aluminate ions and alkali metal ions, which two solutions when mixed contain in the aggregate water, silicate ions, aluminate ions, and alkali metal ions in the proportions required to form crystals of said molecular sieve; separately preheating said two solutions to between about 80° C. to 100° C.; rapidly and intimately mixing said separate preheated solutions to form an aggregate solution; and holding said aggregate solution at between about 80° C. to 100° C. until crystals of said molecular sieve form.

6. A method for synthesizing sodium zeolite X which comprises preparing a first aqueous solution containing silicate ions and sodium ions and a second aqueous solution containing aluminate ions and sodium ions, said two solutions containing in the aggregate water, silicate ions, aluminate ions and sodium ions in such proportions that the oxide mole ratios of reactants in the aggregate solution when mixed fall within the ranges $SiO_2/Al_2O_3$ ---------------------------- 2.5 to 5
$Na_2O/SiO_2$ ---------------------------- 1.2 to 1.5
$H_2O/Na_2O$ ---------------------------- 35 to 60 separately preheating said two solutions to temperatures between about 80° C. and 100° C.; rapidly and intimately mixing said two separate preheated solutions to form an aggregate solution; and holding said aggregate solution at a temperature between about 80° C. and 100° C. until crystals of sodium zeolite X form.

7. A method for synthesizing sodium zeolite A which comprises preparing a first aqueous solution containing silicate ions and sodium ions and a second aqueous solution containing aluminate ions and sodium ions, said two solutions containing in the aggregate water, silicate ions, aluminate ions and sodium ions in such proportions that the oxide mole ratios of reactants in the aggregate solution when mixed fall within the ranges

|  | Range 1 | Range 2 |
|---|---|---|
| $SiO_2/Al_2O_3$ | 0.5 to 1.3 | 1.3 to 2.5. |
| $Na_2O/SiO_2$ | 1.0 to 3.0 | 0.8 to 3.0. |
| $H_2O/Na_2O$ | 33 to 200 | 33 to 200. | separately preheating said two solutions to temperatures between about 80° C. and 100° C.; rapidly and intimately mixing said two separate preheated solutions to form an aggregate solution; and holding said aggregate solution at a temperature between about 80° C. and 100° C. until crystals of sodium zeolite A form.

References Cited in the file of this patent

UNITED STATES PATENTS

| 1,161,200 | Brunn | Nov. 23, 1915 |
| 1,472,011 | Lee | Oct. 23, 1923 |
| 1,906,163 | Lasselle | Apr. 25, 1933 |
| 2,617,712 | Bond | Nov. 11, 1952 |
| 2,882,243 | Milton | Apr. 14, 1959 |
| 2,882,244 | Milton | Apr. 14, 1959 |

FOREIGN PATENTS

| 17,663 | Great Britain | of 1914 |
| 19,194 | Great Britain | of 1913 |